United States Patent [19]

Kerfoot et al.

[11] Patent Number: 4,721,900
[45] Date of Patent: Jan. 26, 1988

[54] SELF-GENERATED CONVERTER FILTER

[75] Inventors: Charles S. Kerfoot, Pasadena; Walter E. Milberger, Severno Park, both of Md.

[73] Assignee: The United States of America as represented by the Secretary of the Air Force, Washington, D.C.

[21] Appl. No.: 893,831

[22] Filed: Aug. 6, 1986

[51] Int. Cl.$^4$ ............................................. H01F 27/42
[52] U.S. Cl. ..................................... 323/356; 336/69; 363/48
[58] Field of Search ................. 336/69; 323/356, 359; 363/44–48

[56] References Cited

U.S. PATENT DOCUMENTS 3,340,458  9/1967  Keller ..................................... 363/48
3,868,561  2/1975  Matthes .................................. 363/36
4,341,990  7/1982  Davis ..................................... 323/303

Primary Examiner—Peter S. Wong
Attorney, Agent, or Firm—William G. Auton; Donald J. Singer

[57] ABSTRACT

The reduction of non-monotonic degradation characteristics induced in the output signals in high-power applications of a transformer which has a primary winding and n secondary windings which have a total of N turns, where n and N are integers, is accomplished by replacing the n secondary windings with m replacement windings, where m is an integer less than n. When the replacement windings have a total of N turns, they produce an output signal with reduced degradation normally caused by stray capacitance and inductance leakage in the secondary windings.

4 Claims, 12 Drawing Figures

INPUT #1

INPUT #2

RIPPLES ADD
2V
OUTPUT

INPUT #1

INPUT #2

RIPPLES CANCEL
OUTPUT

SELF-GENERATED CONVERTER FILTER

STATEMENT OF GOVERNMENT INTEREST

The invention described herein may be manufactured and used by or for the Government for governmental purposes without the payment of any royalty thereon.

CROSS-REFERENCE TO RELATED APPLICATIONS

The subject matter of this application is related to the subject matter contained in the following U.S. patent applications Ser. Nos. 032,406, filed Mar. 27, 1987 entitled "The Milberger Converter" by W. E. Milberger et al; 910,113 filed Jan. 28, 1986 entitled "Energy Recoverable Choke Feed" by W. E. Milberger et al; and 891,821 filed Aug. 1, 1986 entitled "High-Voltage Milberger Slip Slide Power Conditioner by F. B. Jones et al and 891,822 filed on Aug. 1, 1986 by Franklin B. Jones et al. entitled "Slewing Power Supply For Programmable Phase Shifter Drive".

BACKGROUND OF THE INVENTION

The present invention relates generally to electric power conversion systems, and more specifically to a means for reducing non-monotonic increases in output signals encountered in high-voltage applications of the Milberger converter.

In conventional high-voltage, high-frequency converter transformers, great effort is expended in trying to reduce the leakage inductance in the windings, and keep stray capacitance to a minimum. The reason is that the ideal output of such systems is a full wave rectified square wave which has no undesirable gaps. Stray capacitance and inductance leakage in the transformer windings are known to produce undesirable resonance signals which degrade the waveshape of the output and causes a voltage ripple.

The task of eliminating non-linearities from output signals from high-voltage applications of the Milberger converter is alleviated, to some extent, by the following U.S. Patents, the disclosure of which are incorporated by reference:

U.S. Pat. No. 3,868,561 issued to Matthes;
U.S. Pat. No. 3,340,458 issued to Keller;
U.S. Pat. No. 4,341,990 issued to David; and
U.S. Pat. No. 3,925,715 issued to Venable.

The Matthes patent discloses a resonant circuit transformer arrangement including a ripple smoothing filter formed from a transformer used to couple a rectifier to an inverter.

The Davis patent discloses a circuit for reducing high frequency line ripple in regulating circuits.

The Keller patent discloses an "LC" filter choke using two transformers each 180° out of phase which cancel ripple.

The Venable reference discloses a pulsewidth modulated DC to DC converter with output circuits which replace conventional output inductive filters.

The references cited above are exemplary in the art and depict the use of output circuits, including the use of a second transformer in the Keller reference, to condition converter output signals. However, close observation of the high-voltage application of the Milberger converter has indicated that the undesirable non-monotonic degradation of the output waveform is a product of a resonance frequency signal produced by inductances and capacitances particularly in the secondary windings. This suggests that rather than the "add-on" solutions of the prior art references including L-C filters, etc., perhaps the characteristics of the secondaries themselves should be modified.

The Milberger converter is best understood by referring to the U.S. patent application Ser. No. 032,406 entitled "The Milberger Converter", filed on Mar. 27, 1987, the disclosure of which is incorporated by reference. The Milberger converter has an advantage over conventional converters in that its output is conditioned by two independent square waves which either add or cancel. The output voltage is directly proportional to a percentage of addition time to the total time, i.e., Vo equals Vp ($T_{ADD}/T_{TOTAL}$).

As disclosed in the above-cited reference, the Milberger converter's 100 percent dynamic range, small size, and reduced number of parts are among its main advantages. However, a problem has been encountered when the Milberger converter is used in high voltage and high power applications. Medium power is, in the present context, defined as electrical power of around 100 watts, and high power is considered to be electrical power above 10 kw. In high voltage and high power applications there exists a non-monotonic increase in the output voltage of the Milberger converter, which occurs when its control circuit commands a linear increase. Investigation of the phenomenon indicates that it is caused by the occurrence of the presence of an ultra-high frequency ripple on top of the pulses of the output waveform. When this ripple is in phase with the output signal, it adds and the output increases. As the phase of the ripple shifts, it alternately increases and decreases on top of the output signal.

The task of reducing these non-monotonic increases in the output signals of Milberger converters in high power applications is alleviated by the U.S. patent application entitled "High-Voltage Milberger Slip Slide Power Conditioner" by F. B. Jones et al, the disclosure of which is incorporated by reference. Ihe disclosure of Jones et al describes the design of a slip slide power conditioner in which the output signal of the Milberger conditioner is conditioned by a signal processing circuit to remove non-linearities due to secondary ringing or resonance that beats with harmonics of the chopper frequency.

The system proposed by Jones et al is an effective solution which conditions the output signals of the Milberger converter in high power applications. Jones et al follow the tradition of the above-cited references of Venable, Davis, Keller, and Matthes by presenting an "add-on" circuit to condition the output of a transforxer or a converter. However, a closer observation of the origin of the present problem indicates the following. The ringing frequency is a product of the output transformer inner winding capacitance and inductance leakage. Since the origin of the problem occurs in the output transformer, there exists the need for a more direct solution to the present problem: change the characteristics of the output transformer. The present invention satisfies that need.

SUMMARY OF THE INVENTION

The present invention provides a means of reducing non-monotonic non-linearities from the output signal of the Milberger converter in high power applications by changing the characteristics of the output transformer to produce a self-generated converter filter.

The Milberger converter and all conventional converters customarily have an averaging circuit or L-C filter which processes the output signal. In such systems, their design entails the winding of a maximum number of secondary windings while trying to minimize stray capacitance and inductance leakage. The solution of the present invention includes a design which is exactly opposite of convention. This design directs the minimization the secondary windings. One design embodiment winds only one secondary to produce the self-generated effect of a large L-C filter within the transformer. This self-generated converter filter is just as effective and real as an externally applied L-C filter, but does not entail externally mounted and wired circuitry.

It is a principal object of the present invention to provide a design which reduces degradation of the output signals of converters due to stray capacitance and inductance leakage in their output transformers.

It is another object of the present invention to provide a means of reducing non-monotonic non-linearities in the output signals of Milberger converters in high power applications.

It is another object of the present invention to reduce degradation in the output signal of Milberger converters without a dependance upon external conditioning L-C filters.

It is another object of the present invention to change the characteristics of the output transforxer to reduce output stray capacitances and inductance leakage.

These objects together with other objects, features and advantages of the invention will become more readily apparent from the following detailed description when taken in conjunction with the accompanying drawings wherein like elements are given like reference numerals throughout.

DETAILED DESCRIPTION OF THE PREFERRED EMBODIMENT

The present invention is a self-generated converter filter which reduces signal degradation in high power applications of transformers, including Milberger converters.

Figure 1:
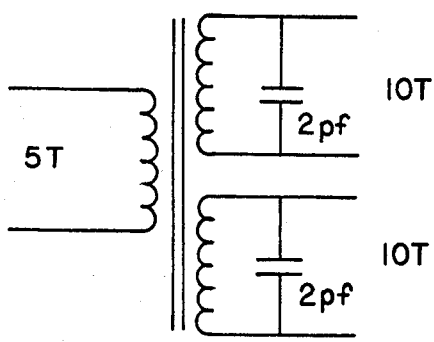
FIGS. 1 through 4 are illustrations of transformer systems which are presented to illustrate the implementation of the design of the present invention.

The reader's attention is now directed towards FIG. 1 which depicts a conventional transformer which has a primary winding 5T with five turns, and two secondaries 10T each with 10 turns. The purpose of FIG. 1 is to illustrate the old method of reducing the effects of stray capacitance and inductance leakage. In conventional systems, such as FIG. 1, the most significant gain in output is realized by increasing the number of secondaries. This improvement comes by virtue of the fact that the inductances and capacitances are referred to the primary by a factor of $N^2$. This can be more clearly shown by example.

Figure 2:
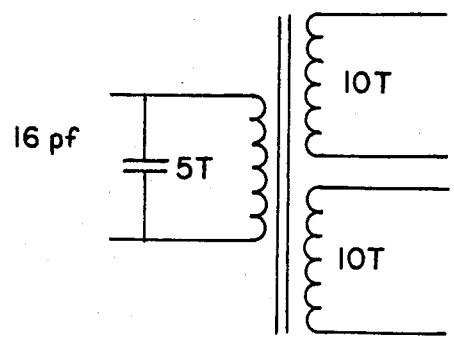

Assume, as depicted in FIG. 2, a transformer with two secondaries of 10 turns each and a primary of 5 turns. The capacitance as referred to the primary is $$C_{PRI} = \Sigma\ Csec/N^2$$

or $$C_{PRI} = \frac{2pf}{(\frac{1}{2})^2} + \frac{2pf}{(\frac{1}{2})^2} = 16pf \tag{1}$$

Figure 3:
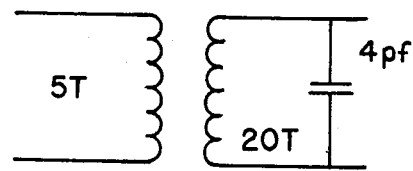
Figure 4:
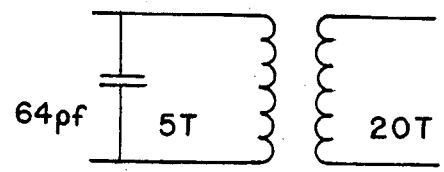

FIG. 3 is an illustration of a transformer design which produces the same output voltage as FIG. 1, but uses a single secondary in accordance with the principles of the present invention. FIG. 4 illustrates the capacitance as referred to the primary winding. As mentioned above, the inductances and capacitances are referred to by a factor of $N^2$. As shown in FIG. 2, N equals the ratio of 1:2 or $\frac{1}{2}$. However, in FIGS. 3 and 4, N equals a ratio of 1:4 or $\frac{1}{4}$.

FIGS. 1-4 are examples which are meant to indicate the improvement produced by the design principles of the present invention. As mentioned above, the factors of the inductances and capacitances in transformers can be referred to by the equivalent inductance and capacitances of the primary winding by a factor of $N^2$. The system of FIG. 4 replaces two secondary windings of FIG. 1, with a single equivalent secondary winding to produce an overall improvement of $N^2$ which is four times better than that of FIG. 1. When the reduction of existing systems entails a replacement of 30 to 60 secondary windings with either a reduced number of windings or a single equivalent windings, the improvement is tremendous. The overall reduction of the effects stray capacitance and inductance leakage on the output signals of converters in high powered applications is described as the product of a self-generated converter filter. This filter is "self-generated" in that, although real and measurable signal improvement occurs, it is the product of the design of the output transformer and not externally "add-on" L-C filters. However, the effect of the self-generated filter is just as real and measurable as if an externally-mounted, hard-wired L-C filter had been added to the output of the transformer. As mentioned above, the system of FIGS. 3 and 4 respectively replace the two secondary windings of FIGS. 1 and 2 with a single equivalent secondary winding. As shown in FIGS. 3 and 4 the replacement secondary winding is characterized as having the same number of turns as the total possessed by the two individual secondary windings. As a result, the replacement secondary winding produces an output voltage equalling the total of that produced by the two replacement secondary windings.

The actual resistance loads supported by the secondary windings of FIGS. 1-4 are intentionally not shown for the following reason. Since the circuits of FIGS. 3 and 4 respectively replace the circuits of FIGS. 1 and 2 the FIGS. 3 and 4 circuits always support the same loads that were connected to the circuits in FIGS. 1 and 2. More specifically, if the two secondary windings of FIGS. 1 and 2 are connected together to support a single load, then the replacement secondary winding also supports this single load. If the two secondary winding of FIGS. 1 and 2 separately support two separate resistance loads, the replacement secondary winding also supports these two separate resistance loads by being connected in a series circuit with them.

As described above, the design principles of the present invention might best be expressed as a process of improving converter and transformer outputs by replacing n secondary windings which have a total of N turns, (where n and N are integers) with m secondary windings having a total of N turns but where m is an integer less than n. In its most extreme case m equals 1.

Figure 5:
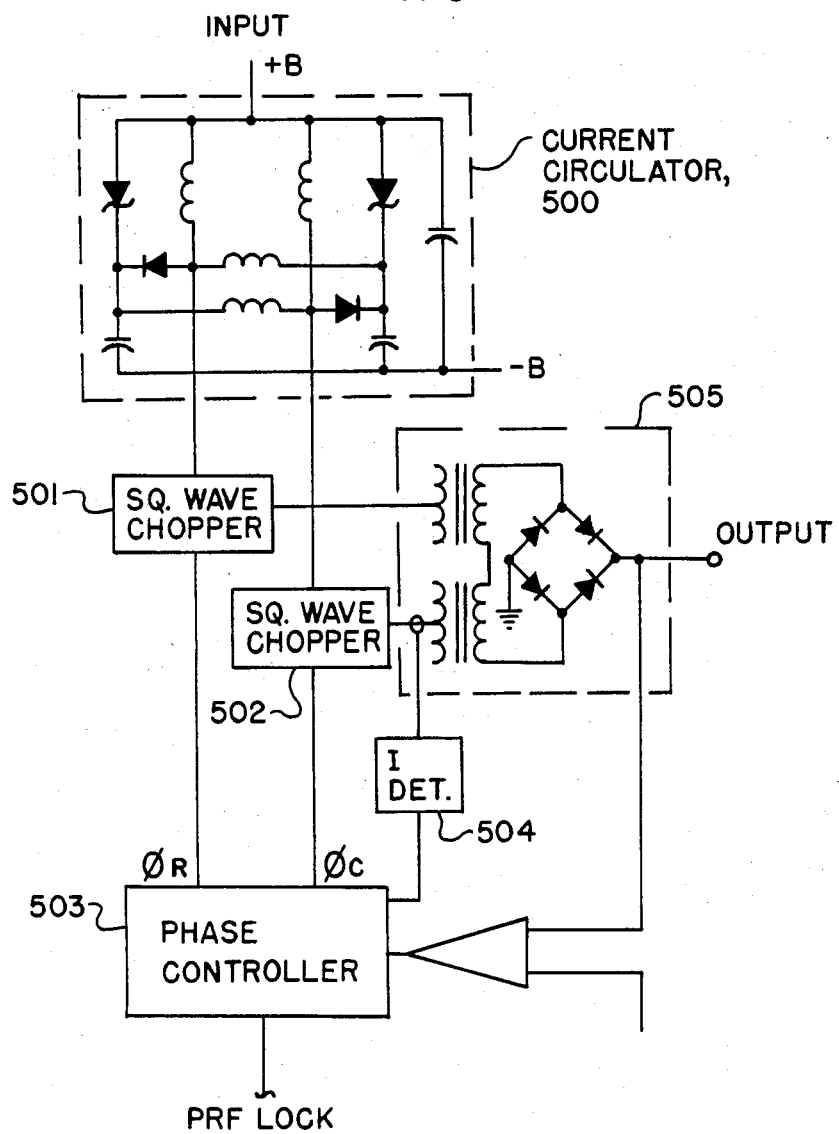
FIG. 5 is a circuit diagram of the Milberger converter application in the Jones et al reference.

While the system of the present invention is not limited to Milberger converters, it is especially applicable to solve the problems Milberger converters encounter in high powered applications. FIG. 5 is an illustration of the Milberger converter application used in the "High-Voltage Milberger Slip Slide Power Conditioner" system of the Jones et al reference.

The Milberger Converter consists of two or more current-fed square wave choppers whose phase relationship may be varied over 180 degrees. When the outputs of two such choppers are combined by a common secondary transformer winding, the average output voltage may be varied from zero to twice the square wave amplitude. The new converter differs from the old phase controlled converters in that it provides frequency agility and in-line current limiting at high efficiencies over a wide frequency range.

Figure 6:
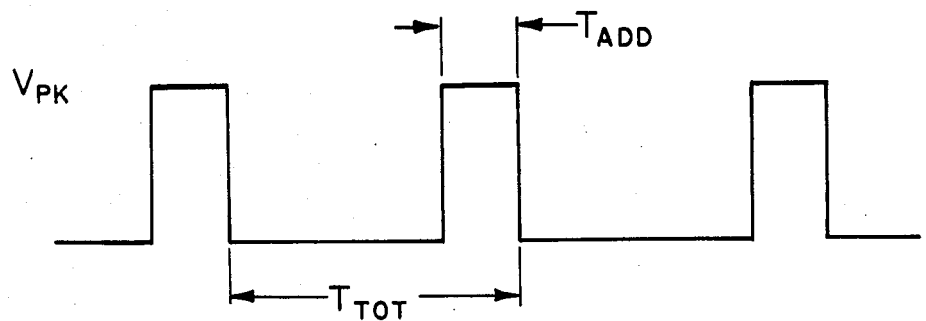
FIG. 6 is an illustration which indicates that the output voltage of the Milberger converter is proportional to a percentage of addition time to total time.

The Milberger Converter-Regulator works by the principal of having parts of two independent square waves either add or cancel. The output voltage is directly proportional to the percentage of addition time to the total time, i.e., $V_o = V_p (T_{ADD}/T_{TOTAL})$ as illustrated in FIG. 6.

As mentioned above, when the Milberger converter regulator is used in high voltage applications, there exists a non-monotonic increase in the output voltage as the control circuit demands a linear increase. As illustrated in FIGS. 7A, 7B, 7C and 8A, 8B, and 8C, this is caused by the ultra-high frequency ripple on top of the two input pulses on the top of the output pulses.

Figure 7A:
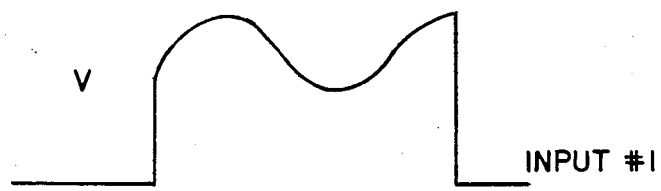
FIGS. 7A, 7b, and 7C are, respectively, illustrations of a first input signal, and second input signal, which produces an output signal in which ripples add.
Figure 7B:
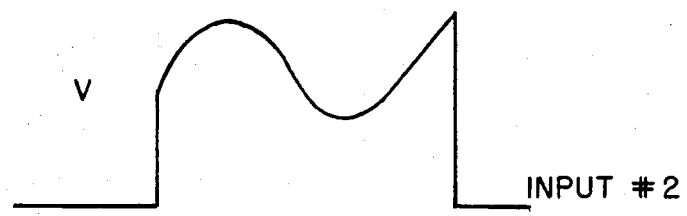
Figure 7C:
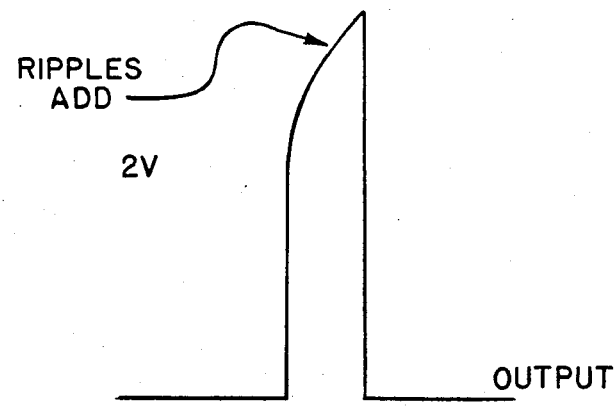
Figure 8A:
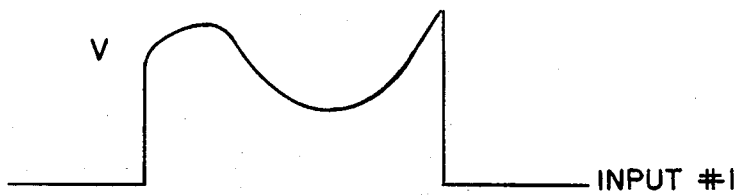
FIGS. 8A, 8B, and 8C are, respectively, illustrations of a first input signal, and second input signal, which produces an output signal in which ripples cancel.
Figure 8B:
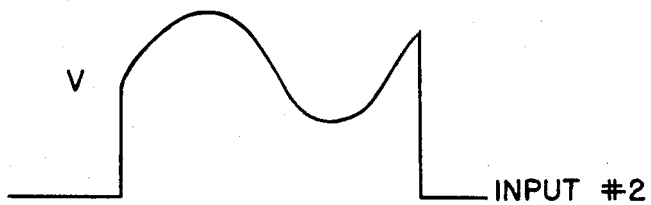
Figure 8C:
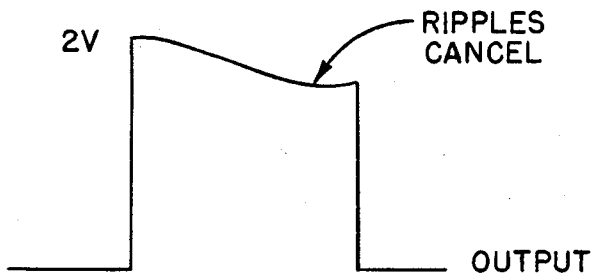

FIGS. 7A and 7B depict two degraded square waves of a Milberger converter whose ripples add in the output signal of FIG. 7C. FIGS. 8A and 8B depict two degraded square waves of a Milberger converter whose ripples subtract in the output signal of FIG. 8C.

When the ripple is in phase, it adds and the output increases. As the phase shifts, it alternately increases and decreases on top of the linear increase. The present invention, as described above alters the design of the windings of transformers to provide a self-generated converter filter that reduces non-linearities in converter output signals.

Note that to practice this invention, it is not necessary to physically destroy or replace the original secondary windings. The new secondary configuration may be added to the old combination such that in high-power applications (greater than 10 kilowatts) the new winding configuration is switched in to interact with the primary transformer so that it produces an improved voltage output signal which has reduced non-linearities produced by stray capacitances and inductance leakage compared with the output signal of the original secondary windings.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A process of reducing non-linearities in output signals in high-power applications of a transformer which produces an output voltage signal using a primary winding and n secondary windings, wherein n is an integer, said secondary windings having a total of N turns, wherein N is an integer, said process comprising the steps of:

removing said n secondary windings; and replacing said n secondary windings with a replacement winding configuration which has a total of about N turns, and comprises m replacement secondary windings where m is an integer ranging from 1 to M and wherein M is an integer which is less than n, said replacing step thereby allowing said replacement winding configuration to produce an improved output voltage signal which has an amplitude which is approximately equal to that of said output voltage signal, said improved output voltage signal having reduced non-linearities produced by stray capacitances and inductance leakage compared to said output voltage signal.

2. A process, as defined in claim 1, wherein said replacing step comprises replacing said n secondary windings with a single replacement secondary winding which has N turns.

3. A process of reducing non-linearities in output signals in high-power applications of a transformer which produces an output voltage signal using a primary winding and n secondary windings, wherein n is an integer, said secondary windings having a total of N turns, wherein N is an integer, said process comprising the step of adding a winding configuration for use with said primary winding in high-power applications, said winding configuration having a total of about N turns, and comprises m new secondary windings where m is an integer ranging from 1 to M and wherein M is an integer which is less than n, said adding step thereby allowing said winding configuration to produce an improved output voltage signal which has an amplitude which is approximately equal to that of said output voltage signal, said improved output voltage signal having reduced non-linearities produced by stray capacitances and inductance leakage compared to said output voltage signal.

4. A process, as defined in claim 3, wherein said adding step comprises adding a single replacement secondary winding which has N turns.

* * * * *